United States Patent [19]

Suzuki et al.

[11] 4,437,740

[45] Mar. 20, 1984

[54] QUICK RETURN BEAM SPLITTER FOR A SINGLE LENS REFLEX CAMERA

[75] Inventors: Takashi Suzuki, Yokohama; Susumu Ito, Tokyo, both of Japan

[73] Assignee: Canon Kabushiki Kaisha, Tokyo, Japan

[21] Appl. No.: 407,473

[22] Filed: Aug. 12, 1982

[30] Foreign Application Priority Data

Aug. 18, 1981 [JP] Japan .................................. 56-29168

[51] Int. Cl.³ ............................................. G03B 7/099
[52] U.S. Cl. ................................... 354/476; 354/152; 354/477
[58] Field of Search ...................... 354/56, 59, 152, 22, 354/23 R

[56] References Cited

U.S. PATENT DOCUMENTS 4,081,807  3/1978  Urano et al. ......................... 354/152

Primary Examiner—Michael L. Gellner
Attorney, Agent, or Firm—Fitzpatrick, Cella, Harper & Scinto

[57] ABSTRACT

A quick return beam splitter for a single lens reflex camera for directing the light from a picture-taking lens to both a viewfinder optical system and an AF optical system having a photoarray sensor when a focal plane shutter is not being operated is provided. The beam splitter has a metal reflecting film of high reflection factor partly deposited by evaporation on the surface of a glass substrate, and a dielectric material reflecting film of low reflection factor deposited by evaporation on the metal reflecting film.

5 Claims, 5 Drawing Figures

QUICK RETURN BEAM SPLITTER FOR A SINGLE LENS REFLEX CAMERA

BACKGROUND OF THE INVENTION

1. Field of the Invention

This invention relates to a beam splitter disposed rearwardly of the picture-taking lens for dividing the light from the picture-taking lens.

2. Description of the Prior Art

A beam splitter having a dielectric material multilayer film deposited by evaporation on a transparent substrate such as a glass substrate is usually used as a quick return beam splitter for a single lens reflex camera.

This beam splitter has an advantage that since it has substantially the same reflection factor in any portion thereof, an object image relatively excellent in resolution as compared with that in a beam splitter of the type hereinafter described is formed on the focusing plate of the viewfinder optical system. However, this beam splitter has a polarizing characteristic and this has led to the possibility that a metering error arises when the light from the object is a polarized light.

Beam splitters are also known in which non-evaporated portions in the form of spots or slits are provided on the surface of a transparent substrate and a metal film is deposited by evaporation on the portions of the surface other than the non-evaporated portions (*Asahi Camera*, July, 1963, P. 215, *Asahi Camera*, July, 1965, pl. 232, Japanese Patent Publication No. 29793/1969, U.S. Pat. No. 4,081,807 and Japanese Laid-open Patent Application No. 119030/1978). In such beam splitters, the portion on which a metal film is formed acts as a reflecting surface and the portion on which the metal film is not formed acts as a light-transmitting surface.

Such beam splitters have no polarizing characteristic unlike the previously mentioned beam splitter and therefore do not give rise to the problem of metering errors resulting from polarized light. However, such beam splitters have light-transmitting portions in the form of spots or numerous slits and this leads to the disadvantage that the resolving power is reduced. Further, in such beam splitters, if an attempt is made to increase the quantity of transmitted light, various disadvantages would arise. That is, if the number of the light-transmitting portions is made constant and the size thereof is increased to increase the quantity of transmitted light, there would occur a disadvantage that the pattern in the form of spots or numerous slits can be observed through the viewfinder optical system and, if the size of the light-transmitting portions is made constant and the number thereof is increased, there would arise a disadvantage that flare is created by diffraction or scattering and the resolving power of the object image is reduced.

SUMMARY OF THE INVENTION

It is an object of the present invention to provide a quick return beam splitter for a single lens reflex camera which eliminates the above-noted disadvantages.

Such an object can be achieved by disposing a metal reflecting film of high reflection factor and a reflecting film of low reflection factor partly on a substrate.

This beam splitter which uses a metal reflecting film does not suffer from the problem of polarization and, even if the reflecting film of low reflection factor is formed by an interference film, the problem of polarization is reduced as a whole. Further, in this beam splitter, the portion other than the metal reflecting film also is a reflecting film of low reflection factor and therefore, the sum of the areas of the metal reflecting film portions can be made relatively small and thus, the aforementioned problems that the pattern can be seen and that flare arises are alleviated.

The invention will become more fully apparent from the following detailed description thereof taken in conjunction with the accompanying drawings.

DESCRIPTION OF THE PREFERRED EMBODIMENTS

Figure 1:
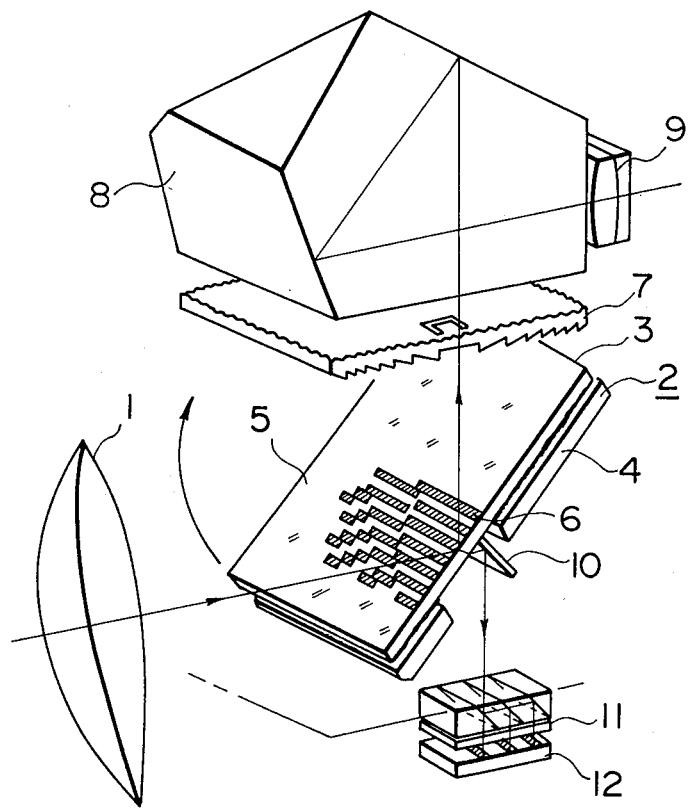
FIG. 1 is a fragmentary view showing the optical system of a single lens reflex camera to which the present invention is applied.

Referring to FIG. 1 which shows a first embodiment of the beam splitter of the present invention, reference numeral 1 designates a picture-taking lens. A quick return mirror 2 is disposed rearwardly of the lens 1 and is positioned at its shown position when a shutter, not shown, is in its operative condition. When the shutter is operated, the quick return mirror 2 is rotated in the direction of arrow and becomes positioned outside the light beam from the lens 1. The mirror 2 comprises a beam splitter 3 and a beam splitter support 4. The beam splitter 3 has a metal reflecting film portion 5 of high reflection factor and a reflecting film portion 6 of low reflection factor formed on a transparent substrate such as glass. The light reflected by the metal reflecting film 5 and the reflecting film portion 6 of low reflection factor of the beam splitter 3 travels toward a focusing plate 7. The image of an object formed on the focusing plate 7 may be observed through a pentaprism 8 and an eyepiece 9. The light passed through the reflecting film portion of low reflection factor of the beam splitter 3 passes through an opening in the support 4, and thereafter is downwardly directed by a sub-mirror 10. Designated by 11 is a light-dividing element provided at the bottom of the camera. This light-dividing element 11 divides a light into three, and forms three images of the predetermined film surface and the surfaces before and behind the predetermined film surface on the arrays of an array sensor 12.

Whether the picture-taking lens 1 is forming a focused image on the film surface is judged from the conditions of these images.

The fact that the area of the reflecting film portion 6 of low reflection factor of the beam splitter of FIG. 1 is small as compared with the prior art example in which this portion 6 is a transmitting surface will now be explained.

Description will hereinafter be made on the assumption that a beam splitter in which the average transmission factor T in a predetermined area about the optical axis is 50% is to be obtained. It is also assumed that the reflection factor of the metal reflecting film is 100%

Figure 2:
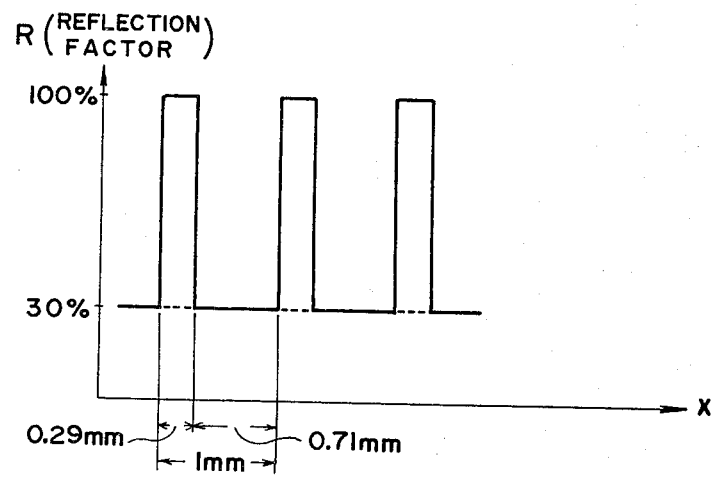
FIG. 2 shows the transmission factor distribution of the complex area type quick return beam splitter according to the present invention.

(actually about 90%), that the reflection factor of the reflecting film of low reflection factor is 30% and that the pitch P of the repetition pattern of the metal reflecting film and the reflecting film of low reflection factor is 1 mm. If a beam splitter having an average transmission factor of 50% is to be obtained under such conditions, the thickness of the metal reflecting film portion will be 0.29 mm and the thickness of the reflecting film portion of low reflection factor will be 0.71 mm, as shown in FIG. 2.

Figure 3:
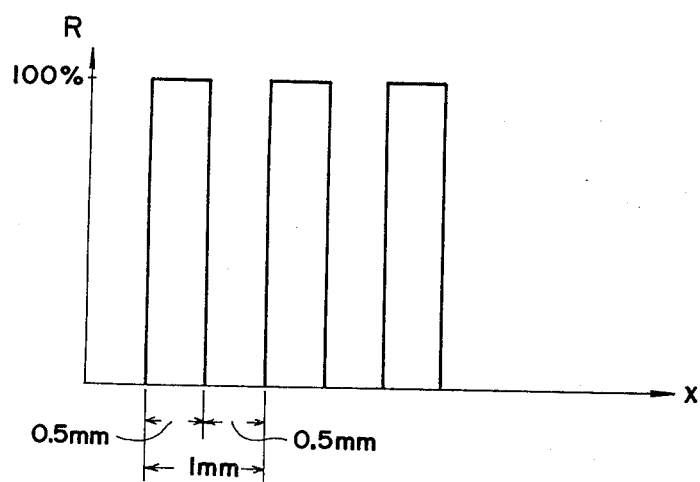
FIG. 3 shows the transmission factor distribution of the simple area type quick return beam splitter.

On the other hand, in order to obtain an average transmission factor of 50% in the beam splitter of the prior art, the thickness of the metal reflecting film portion is 0.5 mm and the thickness of the transmitting portion is 0.5 mm, as shown in FIG. 3. In this case, the reflection factor of the glass surface of the transmitting portion is 0% (actually, there is a reflection of 4% in the boundary surface between the glass substrate and the air, but if the boundary surface is subjected to a transmission factor increasing treatment, there will be a reflection of the order of 0.1%).

As is apparent from the foregoing description, the beam splitter of the present invention has a small reflection factor difference as compared with the beam splitter of the prior art comprising a combination of a metal reflecting film portion and a transmitting portion, whereby the pattern of the beam splitter becomes difficult to see and the area of the metal reflecting film portion can be made smaller and thus, the aforementioned problem of flare can be reduced.

Figure 4:
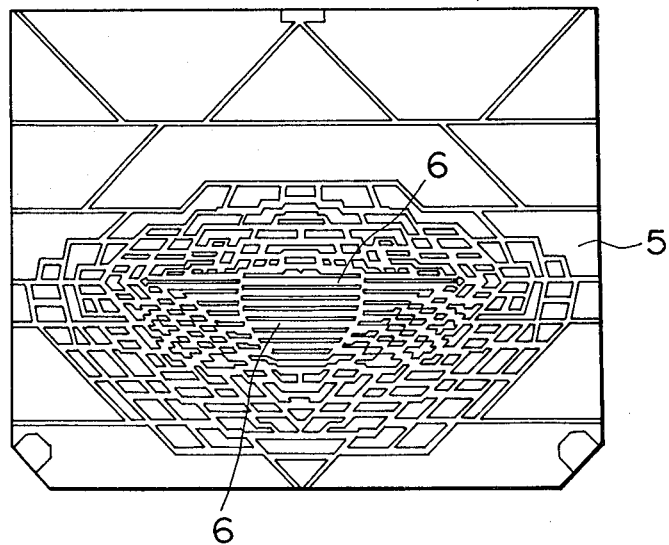
FIGS. 4 and 5 show patterns on the quick return beam splitter according to the present invention.
Figure 5:
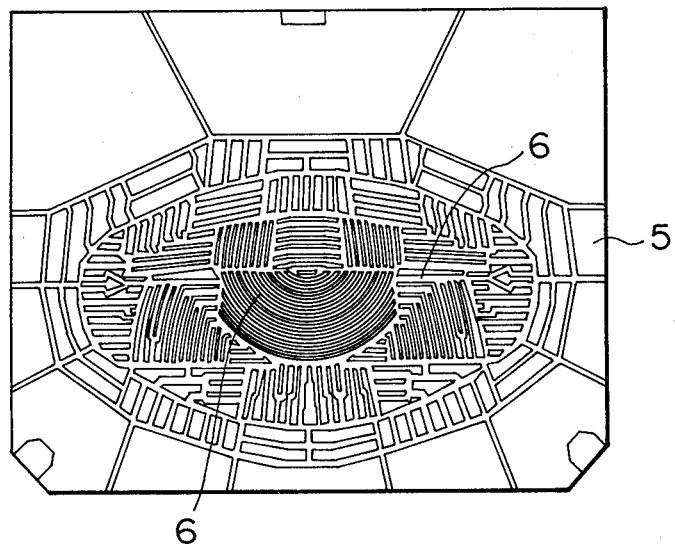

FIGS. 4 and 5 show beam splitters which differ in pattern configuration from the beam splitter of FIG. 1. A feature of this pattern configuration is that the rate at which the reflecting film 6 of the low reflection factor occupies is higher in the neighborhood of the point whereat the mirror intersects the optical axis and said rate becomes lower in the direction away from the optical axis. Also, the size of the reflecting film of low reflection factor along the direction corresponding to the row direction of the array sensor 12 of FIG. 1, namely, the lateral direction in FIGS. 4 and 5, is determined such that there is not formed an image having a frequency component higher than the space frequency 2PS twice the pitch of the array sensor. The array sensor cannot properly resolve any space frequency component higher than the Nyquist frequency defined by the space frequency 2PS twice the sensor pitch P and accordingly there occurs a hindrance to the proper reading of information and for this reason, by determining the size of this reflecting film of low reflection factor, it is caused to act as a low-pass filter.

The actual film constructions will hereinafter be described.

In an example, the film is a glass substrate-Al $(600 \sim 1000$ Å$)$-$MgF_2$ $(\sim 1000$ Å$)$-$ZrO_2$ $(\sim 700$ Å$)$-air, and a dielectric material film renders the reflection of the Al film higher and performs the role of a protective film. The glass surface lacking an Al film is formed only of a dielectric material film and has a reflection factor of about 30%.

As another film construction which performs a similar function, there is a glass substrate-Al $(600 \sim 1000$ Å$)$-$SiO_2$ $(\sim 1000$ Å$)$-$TiO_2$ $(\sim 600$ Å$)$-air. In the respective film constructions, cerium oxide ($CeO_2 \sim 600$ Å) may be used instead of $ZrO_2$ or $TiO_2$.

As described above in detail, the complex area type quick return beam splitter of the present invention, as compared with an area type quick return beam splitter, is a complex area type quick return beam splitter having a reflecting film having a whole surface of 20–30% and an area type mirror and has all the excellent effects possessed by the area type quick return beam splitter and also has the excellent effect that the resolving power of the viewfinder image is enhanced to improve the quality of image and the darkening of the pattern is decreased. It has been found that the complex area type quick return beam splitter of the present invention displays an excellent function particularly when used as the quick return beam splitter of a single lens reflex camera which has a focus adjusting mechanism and requires as much light as possible in the sensor.

We claim:

1. A quick return beam splitter for a single lens reflex camera comprising:
    a transparent substrate member;
    a metal reflecting film of relatively high reflection factor formed on a portion of the surface of said transparent substrate member; and
    a reflecting film of relatively low reflection factor formed on that portion of the surface of said transparent substrate member on which said metal reflecting film is not formed.

2. A quick return beam splitter according to claim 1, wherein said reflecting film of relatively low reflection factor is a dielectric material reflecting film.

3. A quick return beam splitter according to claim 1, wherein said reflecting film of relatively low reflection factor is formed also on said metal reflecting film.

4. A quick return beam splitter according to claim 1, wherein said reflecting film of relatively low reflection factor includes a plurality of reflecting film portions formed in the central portion of said beam splitter so that the average transmission factor of the central portion becomes maximum.

5. A quick return beam splitter according to claim 1, wherein a sensor array is disposed behind said beam splitter and when the pitch of the sensor array is P, the size of said reflecting film of relatively low reflection factor is of a size that an image formed on said sensor array eliminates any frequency component higher than the space frequency twice the pitch P of said sensor array.

* * * * *